(12) United States Patent
Lan

(10) Patent No.: US 10,827,204 B2
(45) Date of Patent: Nov. 3, 2020

(54) LIVE STREAMING PROCESSING METHOD, APPARATUS, AND SYSTEM

(71) Applicant: Tencent Technology (Shenzhen) Company Limited, Shenzhen (CN)

(72) Inventor: Yulong Lan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/547,359

(22) Filed: Aug. 21, 2019

(65) Prior Publication Data

US 2019/0379916 A1    Dec. 12, 2019

Related U.S. Application Data

(63) Continuation of application No. PCT/CN2018/088778, filed on May 29, 2018.

(30) Foreign Application Priority Data

Jun. 7, 2017 (CN) .......................... 2017 1 0423200

(51) Int. Cl.
*H04N 21/2187* (2011.01)
*H04N 21/222* (2011.01)
(Continued)

(52) U.S. Cl.
CPC ..... *H04N 21/2187* (2013.01); *H04L 67/1034* (2013.01); *H04N 21/222* (2013.01); *H04N 21/25875* (2013.01)

(58) Field of Classification Search
CPC ............. H04N 21/2187; H04N 21/222; H04N 21/25875; H04L 67/1034
See application file for complete search history.

(56) References Cited

U.S. PATENT DOCUMENTS 6,910,078 B1 *  6/2005  Raman .............. H04L 29/06027
                                                        709/231
7,318,107 B1 *  1/2008  Menon ................ G06F 11/2025
                                                        700/82
(Continued)

FOREIGN PATENT DOCUMENTS

CN    101605108 A    12/2009
CN    103139661 A     6/2013
(Continued)

OTHER PUBLICATIONS

Tencent Technology, ISRWO, PCT/CN2018/088778, dated Aug. 20, 2018, 7 pgs.
(Continued)

*Primary Examiner* — Jerry B Dennison
(74) *Attorney, Agent, or Firm* — Morgan, Lewis & Bockius LLP

(57) ABSTRACT

Embodiments of this application provide a live streaming processing method, apparatus, and system. The method includes: receiving, by an access server, a live streaming request sent by a proxy server, the live streaming request including at least a stream identifier and authentication success information; and establishing a live streaming connection for the stream identifier with the proxy server in response to the live streaming request, if determining that the live streaming request includes the authentication success information.

15 Claims, 4 Drawing Sheets

(51) Int. Cl.
  *H04N 21/258* (2011.01)
  *H04L 29/08* (2006.01)

(56) References Cited

U.S. PATENT DOCUMENTS

| | | | | |
|---|---|---|---|---|
| 9,673,996 B1* | 6/2017 | Upadhyay | ................ | H04L 12/56 |
| 10,642,738 B1* | 5/2020 | Parakh | ................ | G06F 12/0813 |
| 2010/0191858 A1* | 7/2010 | Thomas | .............. | H04L 65/1069 |
| | | | | 709/231 |
| 2012/0131639 A1* | 5/2012 | Alex | ..................... | H04L 67/148 |
| | | | | 726/3 |
| 2013/0156187 A1* | 6/2013 | Huh | ..................... | H04L 9/0816 |
| | | | | 380/211 |
| 2018/0227292 A1* | 8/2018 | Golshan | .............. | H04L 63/0823 |
| 2019/0036986 A1* | 1/2019 | Sathyanarayana | .... | H04L 65/602 |
| 2019/0379916 A1* | 12/2019 | Lan | ................... | H04N 21/2541 |
| 2020/0260125 A1* | 8/2020 | Xiong | ................. | H04N 21/238 |

FOREIGN PATENT DOCUMENTS

| | | |
|---|---|---|
| CN | 105407008 A | 3/2016 |
| CN | 105430344 A | 3/2016 |
| CN | 106162645 A | 11/2016 |
| CN | 106488335 A | 3/2017 |
| JP | 2007172213 A | 7/2007 |
| JP | 2009146319 A | 7/2009 |
| JP | 2011134123 A | 7/2011 |

OTHER PUBLICATIONS

Tencent Technology, IPRP, PCT/CN2018/088778, dated Dec. 10, 2019, 5 pgs.

* cited by examiner

LIVE STREAMING PROCESSING METHOD, APPARATUS, AND SYSTEM

CROSS-REFERENCE TO RELATED APPLICATIONS

This application is a continuation application of PCT/CN2018/088778, entitled "LIVE STREAMING PROCESSING METHOD, APPARATUS, AND SYSTEM" filed on May 29, 2018, which claims priority to Chinese Patent Application No. 201710423200.1, filed with the China Patent Office on Jun. 7, 2017 and entitled "LIVE STREAMING PROCESSING METHOD, APPARATUS, AND SYSTEM", all of which are incorporated herein by reference in their entirety.

FIELD OF THE TECHNOLOGY

This application relates to the field of network technologies, and in particular, to a live streaming processing method, apparatus, and system.

BACKGROUND OF THE DISCLOSURE

Currently, video live streaming becomes more popular, and contention between video live streaming platforms is relatively fierce. Therefore, it is very important to ensure user experience. Currently, a video live streaming system mainly includes an uplink part and a downlink part. The uplink is anchor streaming, and the downlink is viewing by viewers. For the uplink part in the video live streaming system, generally, an anchor terminal sends, to an access server, a live streaming request carrying a valid signature (that is, a user identity signature), and after the signature is authenticated, the anchor terminal sends audio and video data to the access server for live streaming. Generally, a connection between the anchor terminal and the access server uses a reliable transmission control protocol (TCP) connection, but if the access server is abnormal, a TCP connection is interrupted, causing interruption of streaming of the anchor terminal.

SUMMARY

Embodiments of this application provide a live streaming processing method, apparatus, and system, to effectively avoid a problem of streaming interruption in a video live streaming process.

Specific technical solutions provided in the embodiments of this application are as follows:

A live streaming processing method is performed at a live streaming processing system having a proxy server and a second access server, each server having one or more processors and memory storing programs to be executed by the one or more processors, the method comprising:
  determining, by the proxy server, that a live streaming connection between the proxy server and a first access server is interrupted;
  generating, by the proxy server, a live streaming request in response to the interruption, the live streaming request comprising at least a stream identifier and authentication success information;
  sending, by the proxy server, the live streaming request to the second access server; and
  establishing, by the second access server, the live streaming connection for the stream identifier with the proxy server in response to the live streaming request, after determining that the live streaming request comprises the authentication success information.

A live streaming processing system includes:
  a proxy server, configured to:
  determine, by the proxy server, that a live streaming connection between the proxy server and a first access server is interrupted;
  generate, by the proxy server, a live streaming request in response to the interruption, the live streaming request comprising at least a stream identifier and authentication success information; and
  send the live streaming request to a second access server;
  a second access server, configured to:
  receive the live streaming request sent by the proxy server; and
  establish the live streaming connection for the stream identifier with the proxy server in response to the live streaming request, after determining that the live streaming request comprises the authentication success information.

A non-transitory computer readable storage medium stores a plurality of programs in connection with a live streaming processing system having a proxy server and a second access server, wherein the plurality of programs, when executed by a corresponding server, cause the server to perform steps of the aforementioned live streaming processing method according to any one of the foregoing aspects.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

In a video live streaming process, to avoid streaming interruption of an anchor terminal caused by an abnormal access server, a proxy server may be added between the access server and the anchor terminal. When the access server is abnormal, the proxy server may automatically reconnect to the access server to ensure that there is no streaming interruption.

However, a signature carried in a live streaming request sent by the anchor terminal at first has timeliness. If the signature is out of a duration of validity, the access server is abnormal at this time, causing interruption of the connection with the proxy server connection. When the connection with the proxy server is interrupted, the proxy server sends a cached signature and a stream identifier to the access server to reapply for live streaming. The access server sends the signature to the authentication server which determines that the signature is invalid because the authentication server considers the signature has expired, so that authentication fails. The access server, furthermore, denies live steaming data, causing failure to reconnection of the proxy server. Streaming interruption of the anchor terminal affects the live streaming experience of an anchor and also causes a failure in watching a live streaming video by a viewer.

For this reason, the live streaming request sent by the proxy server to the access server may include a stream identifier and authentication success information. The access server, after receiving the live streaming request, if determining that the live streaming request includes the authentication success information, then establishes a live streaming connection for the stream identifier with the proxy server in response to the live streaming request. In this way, when the access server receives the live streaming request, the access server, if determining that the live streaming request includes the authentication success information, may directly re-establish the live streaming connection with the proxy server without a need of authentication again. This can effectively avoid streaming interruption of anchor terminal caused when the access server is abnormal and the user identity signature is expired, thereby ensuring that there is no streaming interruption of the anchor terminal and improving the live streaming experience of the anchor.

Figure 1:
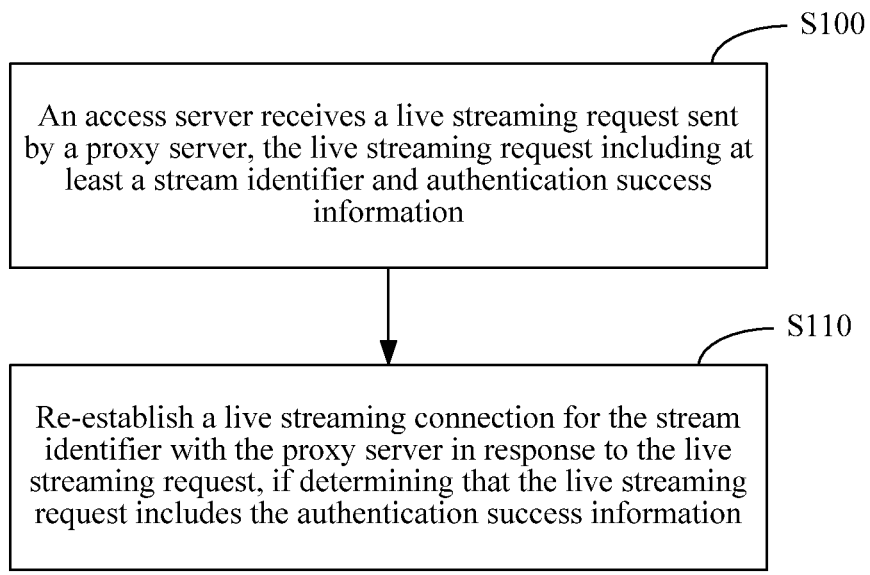
FIG. 1 is a flowchart of a live streaming processing method according to an embodiment of this application.

FIG. 1 is a flowchart of a live streaming method according to an embodiment of this application. Referring to FIG. 1, an execution body of the live streaming processing method provided in this embodiment of this application is an access server, and the method specifically includes the following operations:

S100: The access server receives a live streaming request sent by a proxy server, the live streaming request including at least a stream identifier and authentication success information.

It should be noted that a stream refers to audio and video data continuously pushed by an anchor terminal in a live streaming process, and a stream identifier is used to distinguish between different streams.

Actually, in a live streaming system, two parts as uplink streaming and downlink streaming are divided. The uplink streaming refers to a process of pushing live streaming content to a server and the downlink streaming refers to a process of pulling existing live streaming content by using a specified address from a server. This embodiment of this application is mainly specific to the uplink streaming process in the live streaming system.

The authentication success information is sent by the access server to proxy server when the proxy server successfully establishes a live streaming connection with the access server before interruption, and is used to indicate that a live stream that is for the stream identifier and that is sent by the anchor terminal has been authenticated.

That is, in this embodiment of this application, after the anchor terminal sends the live streaming request to the proxy server for the first time, and the access server determines that the authentication succeeds and establishes the live streaming connection with the proxy server, the access server needs to send the authentication success information to the proxy server, so that the proxy server caches the authentication success information.

In this way, when the access server is abnormal, for example, the access server restarts, or a service process of the access server restarts, is abnormal, or is broken down, the access server disconnects from the proxy server, and the proxy server sends, to the access server again, the live streaming request carrying the cached authentication success information and, so that the access server learns that the live streaming for the stream identifier corresponding to the live streaming request has been authenticated before.

In some embodiments, when the access server is abnormal, and the proxy server determines that the connection with the access server is passively interrupted and re-sends the live streaming request, the proxy server may select another access server for connection, that is, send the live streaming request to another access server, because when the proxy server performs a reconnection, abnormality of the access server connected before may not have been fixed or the access server is dead. This causes a failure in the reconnection of the proxy server. Therefore, the proxy server may select another access server to re-initiate streaming.

S110: The access server establishes a live streaming connection for the stream identifier with the proxy server in response to the live streaming request, if determining that the live streaming request includes the authentication success information.

In some embodiments, the live streaming request may further include a user identity signature corresponding to the anchor terminal.

When S110 is performed, the establishing a live streaming connection for the stream identifier includes:

performing the operation of establishing a live streaming connection for the stream identifier, if verification of a user identity signature and the stream identifier succeeds, where the verification is not verification of a duration of validity of the user identity signature.

That is, in this embodiment of this application, when the live streaming request includes the authentication success information, there are two processing methods for the live streaming request:

In one processing method, if the access server determines that the live streaming request includes the authentication success information, the access server re-establishes the live streaming connection for the stream identifier with the proxy server in response to the live streaming request.

That is, an authentication process is not performed. When the live streaming request includes the authentication success information, it indicates that the live streaming for the stream identifier sent by the anchor terminal has been authenticated before, and the live streaming request is a request sent for a following stream when the proxy server reconnects to the access server, is the request sent by the proxy server which is equivalent to free-wheeling. In this case, the live streaming request may be directly received without authentication. The access server re-establishes the live streaming connection for the stream identifier with the proxy server to receive live streaming data after the reconnection.

In this processing method, when the access server is abnormal, the access server can rapidly establish the live streaming connection with the proxy server.

In the other processing method, if the access server determines that the live streaming request includes the authentication success information, the user identity signature and the stream identifier are verified. After the verification succeeds, the access server re-establishes the live streaming connection for the stream identifier with the proxy server in response to the live streaming request, where the verification is not verification of the duration of validity of the user identity signature.

That is, when the live streaming request includes the authentication success information, the user identity signature and the stream identifier need to be further verified. However, during verification of the user identity signature, time of the user identity signature is neglected. Such a processing method is more secure and reliable, and may further resolve a problem of streaming interruption of the anchor terminal caused when the access server is abnormal and the user identity signature is expired.

In some embodiments, the method for the user identity signature may include: when the user identity signature can be decoded, determining that the verification of the user identity signature succeeds. Herein, the verification of the duration of validity of the user identity signature is neglected. The verification method for the stream identifier may include: when determining that a first stream identifier obtained through decoding from the user identity signature is consistent with the stream identifier in the live streaming request, it indicates that an applied stream is the same as a stream corresponding to the user identity signature, so that the verification of the stream identifier succeeds.

In addition, in this embodiment of this application, for the verification of the user identity signature and the stream identifier, there may be the following two cases:

In one case: the step of verifying the user identity signature and the stream identifier is performed by the access server.

In this case, the authentication server is not needed anymore, and the access server may directly have an authentication function.

In the other case, the authentication server is further included.

First, the access server sends the user identity signature, the stream identifier and the authentication success information to the authentication server, and the authentication server performs authentication on the user identity signature and the stream identifier based on the authentication success information and neglects the duration of validity of the user identity signature.

Then, the access server receives a verification result of the authentication server, and determines whether the verification succeeds based on the verification result.

In this embodiment of this application, the access server receives the live streaming request sent by the proxy server, if determining that the live streaming request includes the authentication success information, the access server establishes the live streaming connection for the stream identifier with the proxy server, so that the access server receives live streaming data after the reconnection, re-streaming is allowed. This can effectively avoid streaming interruption of the anchor terminal caused when the access server is abnormal and the user identity signature is expired, and block impact caused by internal disconnection of the server on the anchor terminal, so that an anchor is not aware of the disconnection, thereby improving live streaming experience of the anchor and further promoting competitiveness of a live streaming platform.

Figure 2:
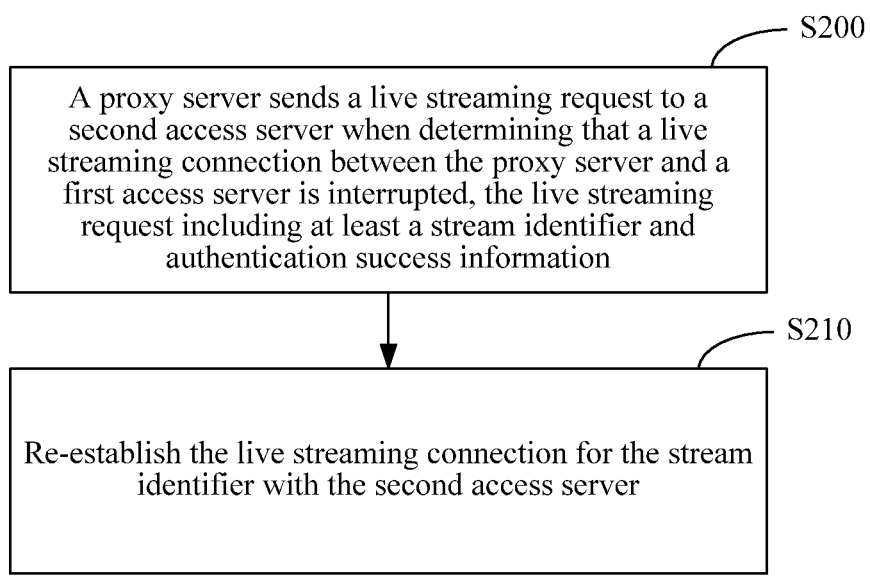
FIG. 2 is another flowchart of a live streaming processing method according to an embodiment of this application.

FIG. 2 is another flowchart of a live streaming processing method according to an embodiment of this application. Referring to FIG. 2, the execution body of the live streaming processing method provided in this embodiment of this application is a proxy server, and the method specifically includes the following operations:

S200: The proxy server sends a live streaming request to a second access server when determining that a live streaming connection between the proxy server and a first access server is interrupted, the live streaming request including at least a stream identifier and authentication success information.

In some embodiments, when performing S200, the proxy server may further send, to the second access server, received live streaming data sent by an anchor terminal.

Therefore, a live streaming delay may further be reduced.

S210: Re-establish the live streaming connection for the stream identifier with the second access server.

In this embodiment, the execution body of the live streaming processing method is the proxy server, and the method corresponding to the live streaming processing method in the embodiment shown in FIG. 1. Therefore, details are no longer described herein.

However, it should be noted that, in this embodiment of this application, when an anchor terminal initiates the live streaming request, if authentication succeeds, and the live streaming connection is established, the first access server returns the authentication success information to the proxy server, and the proxy server locally caches the authentication success information. After that, in this embodiment of this application, the proxy server may recognize the following cases and perform corresponding processing:

The first case: the anchor terminal is reconnected. When the anchor terminal is reconnected, it indicates that the anchor actively interrupts streaming. In this case, the proxy server clears the cached authentication success information and sends a live streaming request carrying a user identity signature corresponding to the anchor terminal to the access server for re-authentication.

The second case: the proxy server is abnormal. When the proxy server is abnormal, the anchor terminal disconnects streaming, and then the anchor terminal needs to perform streaming and re-authentication again.

However, actually, an abnormality probability of the proxy server is extremely low, and even if the proxy server is abnormal, generally, there is a plurality of proxy servers. If one proxy server is abnormal, the proxy server is replaced with another one for re-streaming.

The third case: an access server is abnormal. The proxy server receives a passive disconnection event, after which the proxy server actively initiates connection with the access server and sends the live streaming request carrying the authentication success information to the access server, the access server does not perform authentication or performs authentication but neglects a duration of validity of the user identity signature and re-establishes the live streaming connection with the proxy server.

The live streaming processing method in this embodiment of this application may be applied to the third case, namely, the case in which the access server is abnormal and the duration of validity of the user identity signature is expired, to resolve the problem of failure of reconnection of the proxy server and streaming interruption of the anchor terminal.

Figure 3:
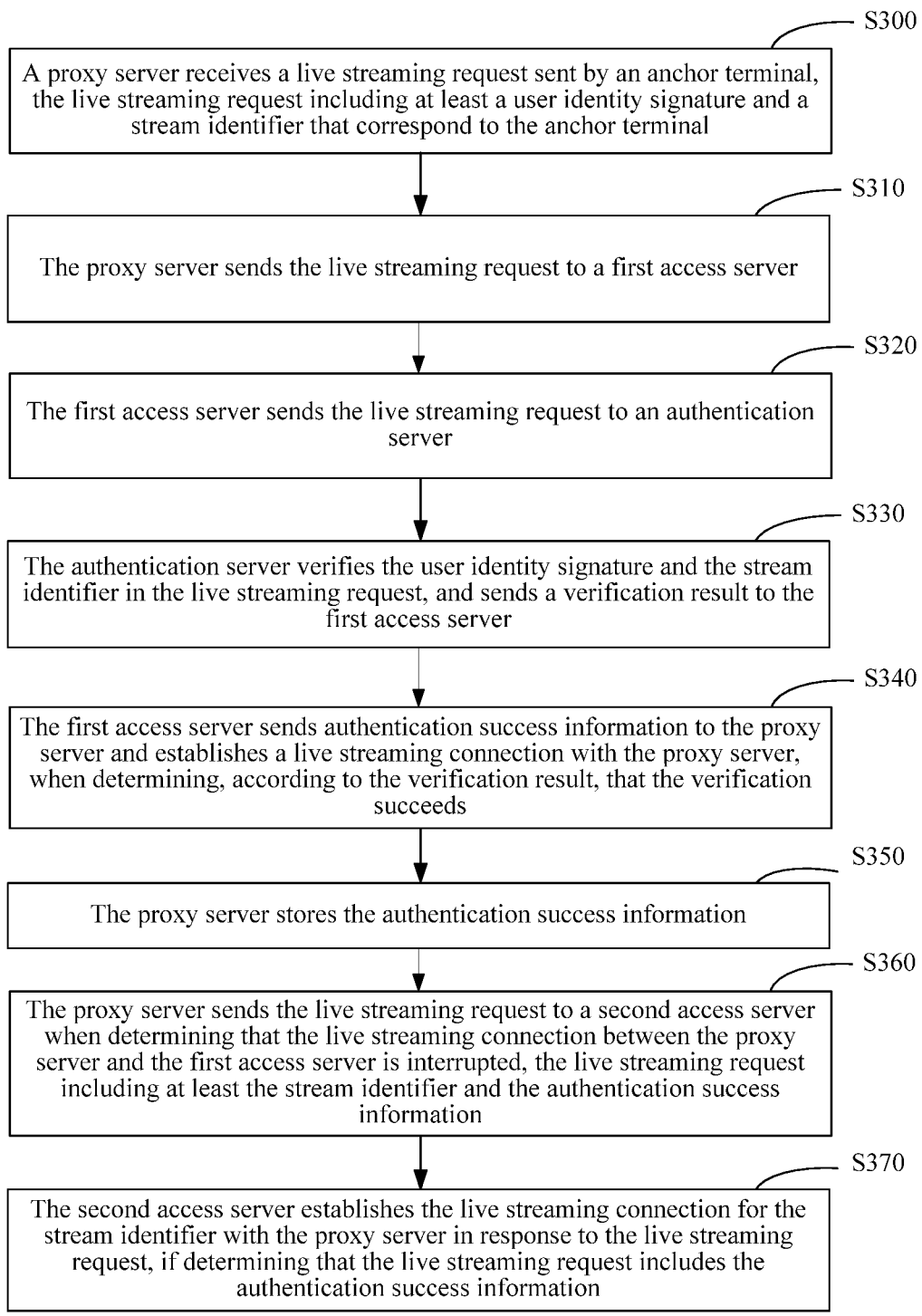
FIG. 3 is still another flowchart of a live streaming processing method according to an embodiment of this application.

FIG. 3 is another flowchart of a live streaming processing method according to an embodiment of this application. Referring to FIG. 3, the live streaming processing method provided in this embodiment describes an entire process in which an anchor terminal sends a live streaming request, authentication succeeds, a live streaming connection is established, and an access server is abnormal. The method specifically includes the following operations:

S300: A proxy server receives a live streaming request sent by an anchor terminal, the live streaming request including at least a user identity signature and a stream identifier that correspond to the anchor terminal.

In some embodiments, the anchor, when performing live streaming, selects a live streaming source, obtains a streaming address and the user identity signature, and then sends the live streaming request to a corresponding server according to the streaming address, to establish a connection with the corresponding server.

The user identity signature further includes a duration of validity of the user identity signature and a stream identifier. Besides, the stream identifier may be generated by the anchor terminal or the server terminal.

Further, when performing S300, the proxy server receives the live streaming data sent by the anchor terminal.

That is, the anchor terminal, when sending the live streaming request to the proxy server, sends live streaming data (namely, audio and video data) to the proxy server. A purpose of parallel transmission performed in this way is to further reduce a live streaming delay, so that live streaming data may be obtained when the connection is established.

Certainly, the anchor terminal can send the live streaming data to the proxy server, after an uplink connection is established. This is not limited in this embodiment.

For example, the anchor who wants to perform live streaming on a live streaming platform needs to register on the live streaming platform in advance, for example, set a user name and a password for real-name authentication. Then, when the anchor starts live streaming, for example, clicks a streaming button, the server returns a streaming address and a user identity signature, enters setting of open broadcaster software (Open Broadcaster Software, obs), and make other corresponding settings based on the streaming address and the user identity signature. After the settings are completed, a live streaming request carrying the user identity signature and a stream identifier is sent to a corresponding proxy server, and current audio and video data may also be sent.

Further, after S300 is performed, the method further includes: storing, by the proxy server, the user identity signature and the stream identifier that correspond to the anchor terminal.

Therefore, the proxy server extracts, from the live streaming request, the user identity signature and the stream identifier that correspond to the anchor terminal, and caches the two locally, to re-establish the live streaming connection with the access server later based on the cached information, when disconnection is caused due to abnormality of the access serve.

S310: The proxy server sends the live streaming request to a first access server.

Further, when performing S310, the proxy server sends the live streaming data to the first access server.

It should be noted that, the proxy server is equivalent to a transfer station that re-sends the received live streaming request and live streaming data to the first access server. The sending method is, for example, transparent transmission. That is, regardless of a service to be transmitted, the proxy server is only responsible for transferring a service that needs to be transferred to a destination node and ensuring quality of transmission, and does not process the service to be transmitted.

S320: The first access server sends the live streaming request to an authentication server.

This embodiment is described by using the authentication server as an example. Certainly, the authentication server may not be used, and instead, the access server replaces the authentication server to achieve an authentication function.

S330: The authentication server verifies the user identity signature and the stream identifier in the live streaming request, and sends a verification result to the first access server.

S340: The first access server sends authentication success information to the proxy server and establishes a live streaming connection with the proxy server when determining, according to the verification result, that the verification succeeds.

S350: The proxy server stores the authentication success information.

In this case, the anchor terminal, the proxy server, and the first access server establish the live streaming connection, uplink streaming of live streaming is implemented, and the anchor may perform live streaming.

S360: The proxy server sends the live streaming request to a second access server when determining that the live streaming connection between the proxy server and the first access server is interrupted, the live streaming request including at least the stream identifier and the authentication success information.

In this embodiment, for a case of abnormality of the first access server, the proxy server receives a passive disconnection event.

S370: The second access server establishes the live streaming connection for the stream identifier with the proxy server in response to the live streaming request, if determining that the live streaming request includes the authentication success information.

In some embodiments, the second access server may also respectively verify the user identity signature and the stream identifier. When verification of both the two succeeds, the second access server re-establishes the live streaming connection for the stream identifier with the proxy server. The verification is not verification of the duration of validity of the user identity signature.

In S360 in this embodiment of this application, when the first access server is abnormal, and the proxy server determines that a connection with the first access server is passively interrupted and re-sends the live streaming request, the proxy server may select another access server for connection, that is, send the live streaming request to another access server (the second access server), because when the proxy server performs a reconnection, abnormality of the access server (the first access server) connected before may not have been fixed or the access server is dead. This causes a failure in the reconnection of the proxy server. Therefore, the proxy server may select another access server to re-initiate streaming.

That is, in this embodiment of this application, provided that the access server determines that the live streaming request includes the authentication success information, whether authentication succeeds or not can be determined, and then the proxy server re-establishes the live streaming connection with the access server, without limiting the access server.

In this embodiment of this application, the access server notifies the proxy server of the authentication success information. The proxy server not only caches the stream identifier and the user identity signature, but also caches the authentication success information. When the access server is abnormal that causes interruption, and the proxy server re-applying for live streaming, the proxy server may send the authentication success information, the user identity signature, and the stream identifier to the access server, so that the access server learns that the live streaming corresponding to the user identity signature and the stream identifier has been authenticated before, and the live streaming connection is directly re-established; or the user identity signature and the stream identifier are verified, and the verification is not verification of the duration of validity of the user identity signature. Verification of the duration of validity of the user identity signature is neglected. In this way, streaming interruption of the anchor terminal can be effectively avoided; impact of internal posting abnormality of the live streaming platform and the duration of validity of the user identity signature on the anchor user is blocked, so that an anchor is not aware of disconnection, thereby improving live streaming experience of the anchor.

Figure 4:
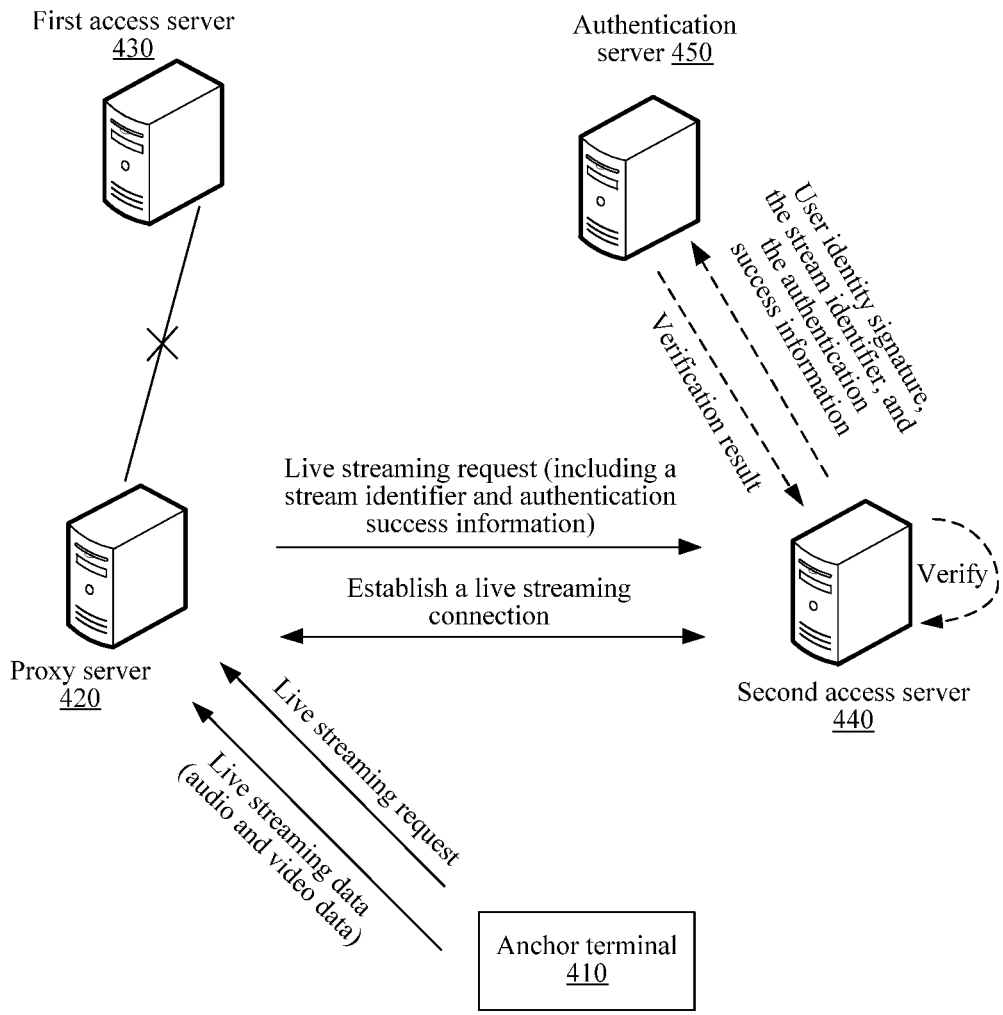
FIG. 4 is an architectural diagram of a live streaming processing system according to an embodiment of this application.

Based on the foregoing embodiment, referring to FIG. 4, in this embodiment, a live streaming processing system includes: an anchor terminal 410, a proxy server 420, a first access server 430, and a second access server 440. Specifically:

The proxy server 420 is configured to send a live streaming request to a second access server 440 when determining that a live streaming connection between the proxy server 420 and a first access server 430 is interrupted, the live streaming request including at least a stream identifier and authentication success information.

The second access server 440 is configured to: receive the live streaming request sent by the proxy server 420, and establish the live streaming connection for the stream identifier with the proxy server 420 in response to the live streaming request, if determining that the live streaming request includes the authentication success information.

In some embodiments, when sending the live streaming request to the second access server 440, the proxy server 420 is further configured to:

send, to the second access server 440, received live streaming data sent by the anchor terminal 410.

In some embodiments, the live streaming request further includes a user identity signature corresponding to an anchor terminal 410; and before establishing the live streaming connection with the proxy server 420, the second access server 440 is further configured to:

separately verify the user identity signature and the stream identifier, and perform the operation of establishing the live streaming connection with the proxy server 420, if the verification succeeds, where the verification is not verification of a duration of validity of the user identity signature.

In some embodiments, the operation of verifying the user identity signature and the stream identifier is performed by the second access server 440.

In some embodiments, the live streaming processing system further includes: an authentication server 450.

When the user identity signature and the stream identifier are to be verified, the second access server 440 is configured to send the user identity signature, the stream identifier, and the authentication success information to the authentication server 450. According to the authentication success information, the authentication server 440 attempts to authenticate the user identity signature and the stream identifier and neglects the duration of validity of the user identity signature; and receives a verification result from the authentication server 450, and determines, according to the verification result, whether the verification succeeds.

In this embodiment of this application, if determining that the live streaming request sent by the proxy server 420 includes the authentication success information, the second access server 440 may determine that live streaming corresponding to an anchor streaming request has been authenticated and may not perform authentication, and the proxy server 420 re-establishes the live streaming connection; or the second access server 440 performs authentication but does not verify the duration of validity of the user identity signature. In this way, for a case in which the first access server 430 is abnormal and the user identity signature of the first access server 430 is expired, the live streaming connection can be re-connected, thereby avoid interruption of streaming of the anchor terminal and improving live streaming experience of the anchor.

Figure 5:
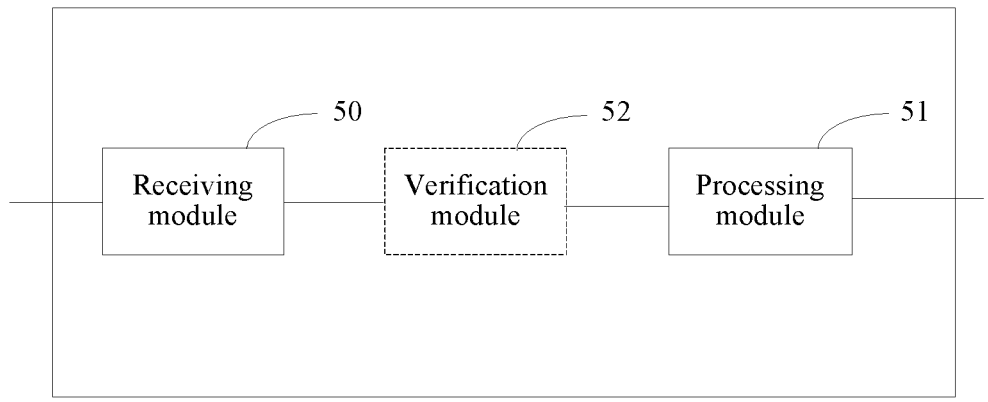
FIG. 5 is a schematic structural diagram of an access server according to an embodiment of this application.

FIG. 5 is a schematic structural diagram of an access server according to an embodiment of this application. Referring to FIG. 5, the access server includes:

a receiving module 50, configured to receive a live streaming request sent by a proxy server, the live streaming request including at least a stream identifier and authentication success information; and a processing module 51, configured to re-establish the live streaming connection for the stream identifier with the proxy server in response to the live streaming request, if determining that the live streaming request includes the authentication success information.

In some embodiments, the live streaming request further includes at least a user identity signature corresponding to an anchor terminal; and the access server further includes:

a verification module 52, configured to: determine whether verification of the user identity signature and the stream identifier succeeds, and trigger the operation performed by the processing module 51, if the verification succeeds, where the verification is not verification of a duration of validity of the user identity signature.

In some embodiments, the verification module 52 is further configured to verify the user identity signature and the stream identifier.

In some embodiments, the verification module 52 is further configured to:

send the user identity signature, the stream identifier, and the authentication success information to an authentication server, where the authentication server separately verifies the user identity signature and the stream identifier according to the authentication success information, and neglects the duration of validity of the user identity signature; and receive an authentication result from the authentication server, and determine, according to the authentication result, whether the verification succeeds.

In this embodiment of this application, the proxy server sends the live streaming request to the access server, and if the live streaming request includes the authentication success information, neglects authentication, and re-establishes the live streaming connection, so that the access server receives live streaming data after the reconnection. This can resolve a problem of streaming interruption of the anchor terminal caused when the access server is abnormal and the user identity signature is expired, and block impact caused by internal disconnection of the server on the anchor terminal, so that an anchor is not aware of the disconnection, thereby improving live streaming experience of the anchor.

Figure 6:
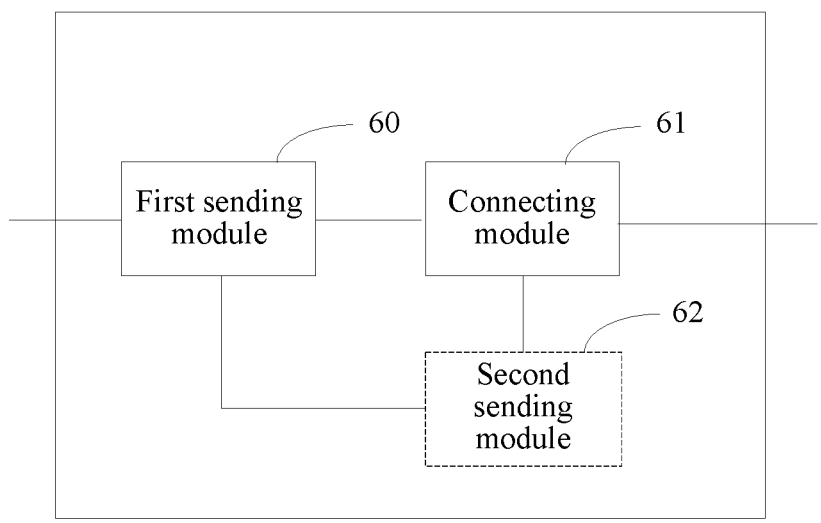
FIG. 6 is a schematic structural diagram of a proxy server according to an embodiment of this application.

FIG. 6 is a schematic structural diagram of a proxy server according to an embodiment of this application. Referring to FIG. 6, the proxy server includes a first sending module 60, configured to send a live streaming request to a second access server when determining that a live streaming connection between the live streaming processing apparatus and a first access server is interrupted, the live streaming request including at least a stream identifier and authentication success information; and a connecting module 61, configured to establish the live streaming connection for the stream identifier with the second access server.

In some embodiments, the proxy server further includes:

a second sending module 62, configured to send, to the second access server, received live streaming data sent by an anchor terminal.

In this embodiment of this application, when the proxy server determines that the connection with the first access server is passively interrupted, which is equivalent to that, the first access server is abnormal, the proxy server receives a passive disconnection event. In this case, the proxy server actively sends the live streaming request to the second access server, and adds stored authentication success information to the live streaming request to re-establish the live streaming connection with the second access server, so that streaming of the anchor terminal will not be interrupted.

Figure 7:
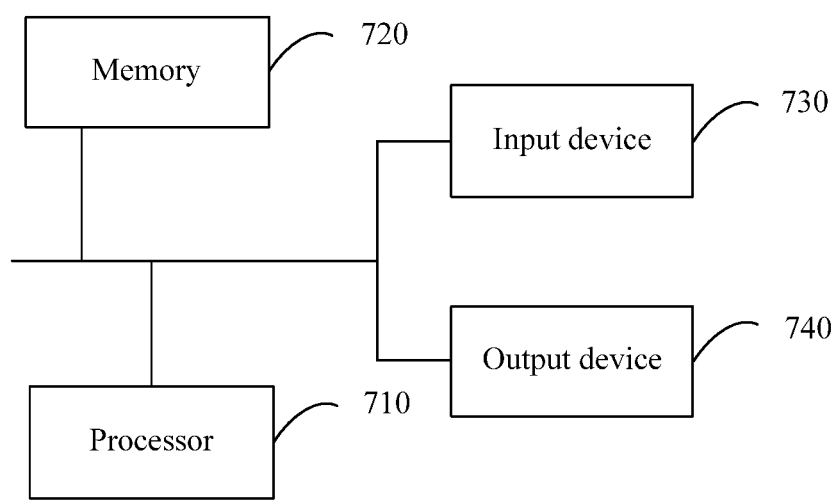
FIG. 7 is a schematic structural diagram of a server according to an embodiment of this application.

FIG. 7 is a schematic structural diagram of a server according to an embodiment of this application.

The schematic structural diagram of the server in this embodiment is applicable to the proxy server, the access server, and the authentication server in the embodiments of this application.

As shown in FIG. 7, the server may include a processor 710 (Center Processing Unit, CPU), a memory 720, an input device 730, an output device 740, and the like. The input device 730 may include a keyboard, a mouse, a touchscreen, and the like. The output device 740 may include a display device, such as a liquid crystal display (LCD) and a cathode ray tube.

The memory 720 may include a read-only memory (ROM) and a random access memory (RAM), and provide a program instruction and data stored in the memory 720 for the processor 710. In this embodiment of this application, the memory 720 may be configured to store a program of a live streaming processing method.

The processor 710 invokes the program instruction stored in the memory 720, and the processor 710 is configured to perform the live streaming processing method in the embodiments of this application according to the obtained program instruction.

Based on the foregoing embodiments, specifically, the processor 710 performs a corresponding live streaming processing method procedure for the access server, the proxy server, and the authentication server.

Based on the foregoing embodiments, an embodiment of this application provides a computer readable storage medium, storing a computer program, and the computer program, when executed by a processor, implementing the live streaming processing method according to any method embodiments described above.

A person skilled in the art should understand that the embodiments of this application may be provided as a method, a system, or a computer program product. Therefore, this application may use a form of a hardware-only embodiment, a software-only embodiment, or an embodiment combining software and hardware. In addition, this application may use a form of a computer program product implemented on one or more computer available storage media (including but not limited to a disk memory, a CD-ROM, an optical memory, and the like) including computer available program code.

This application is described with reference to flowcharts and/or block diagrams of the method, the device (system), and the computer program product in the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Although the embodiments of this application have been described above, once a person skilled in the art learns of a basic creative concept, the person may make other changes and modification to these embodiments. Therefore, the appended claims are intended to be explained as including the foregoing embodiments and all changes and modifications that fall within the scope of this application.

Apparently, a person skilled in the art may make various changes and variations to the embodiments of this application without departing from the scope of the embodiments of this application. In this way, if these modifications and variations made to the embodiments of this application fall within the scope of the claims of this application and equivalent technologies thereof, this application also intends to include these changes and variations.

What is claimed is:

1. A live streaming processing method performed at a live streaming processing system having a proxy server and a second access server, each server having one or more processors and memory storing programs to be executed by the one or more processors, the method comprising:

determining, by the proxy server, that a live streaming connection between the proxy server and a first access server is interrupted;

generating, by the proxy server, a live streaming request in response to the interruption, the live streaming request comprising at least a stream identifier and authentication success information;

sending, by the proxy server, the live streaming request to the second access server; and establishing, by the second access server, the live streaming connection for the stream identifier with the proxy server in response to the live streaming request, after determining that the live streaming request comprises the authentication success information.

2. The method according to claim 1, wherein the live streaming request further comprises a user identity signature corresponding to an anchor terminal; and the establishing the live streaming connection for the stream identifier with the proxy server further comprises:

performing, by the second access server, the operation of establishing the live streaming connection for the stream identifier with the proxy server, after verification of the user identity signature and the stream identifier succeeds.

3. The method according to claim 2, wherein the verification is not verification of a duration of validity of the user identity signature.

4. The method according to claim 2, further comprising: separately verifying, by the second access server, the user identity signature and the stream identifier.

5. The method according to claim 2, further comprising:

sending, by the second access server, the user identity signature, the stream identifier, and the authentication success information to an authentication server, wherein the authentication server separately verifies the user identity signature and the stream identifier according to the authentication success information, and neglects the duration of validity of the user identity signature;

receiving a verification result returned by the authentication server; and determining, according to the verification result, whether the verification succeeds.

6. A live streaming processing system, comprising:

a proxy server, configured to:

determine, by the proxy server, that a live streaming connection between the proxy server and a first access server is interrupted;

generate, by the proxy server, a live streaming request in response to the interruption, the live streaming request comprising at least a stream identifier and authentication success information; and send the live streaming request to a second access server;

a second access server, configured to:

receive the live streaming request sent by the proxy server; and establish the live streaming connection for the stream identifier with the proxy server in response to the live streaming request, after determining that the live streaming request comprises the authentication success information.

7. The live streaming processing system according to claim 6, wherein the live streaming request further comprises a user identity signature corresponding to an anchor terminal; and the establishing the live streaming connection for the stream identifier with the proxy server further comprises:

performing, by the second access server, the operation of establishing the live streaming connection for the stream identifier with the proxy server, after verification of the user identity signature and the stream identifier succeeds.

8. The live streaming processing system according to claim 7, wherein the verification is not verification of a duration of validity of the user identity signature.

9. The live streaming processing system according to claim 7, wherein the second access server is further configured to separately verify the user identity signature and the stream identifier.

10. The live streaming processing system according to claim 7, wherein the second access server is further configured to:

send the user identity signature, the stream identifier, and the authentication success information to an authentication server, wherein the authentication server separately verifies the user identity signature and the stream identifier according to the authentication success information, and neglects the duration of validity of the user identity signature;

receive a verification result returned by the authentication server; and determine, according to the verification result, whether the verification succeeds.

11. A non-transitory computer readable storage medium storing a plurality of programs in connection with a live streaming processing system having a proxy server and a second access server, wherein the plurality of programs, when executed by a corresponding server, cause the server to perform operations including:

determining, by the proxy server, that a live streaming connection between the proxy server and a first access server is interrupted;

generating, by the proxy server, a live streaming request in response to the interruption, the live streaming request comprising at least a stream identifier and authentication success information;

sending, by the proxy server, the live streaming request to the second access server; and establishing, by the second access server, the live streaming connection for the stream identifier with the proxy server in response to the live streaming request, after determining that the live streaming request comprises the authentication success information.

12. The non-transitory computer readable storage medium according to claim 11, wherein the live streaming request further comprises a user identity signature corresponding to an anchor terminal; and the establishing the live streaming connection for the stream identifier with the proxy server further comprises:

performing, by the second access server, the operation of establishing the live streaming connection for the stream identifier with the proxy server, after verification of the user identity signature and the stream identifier succeeds.

13. The non-transitory computer readable storage medium according to claim 12, wherein the verification is not verification of a duration of validity of the user identity signature.

14. The non-transitory computer readable storage medium according to claim 12, wherein the operations further comprise:

separately verifying, by the second access server, the user identity signature and the stream identifier.

15. The non-transitory computer readable storage medium according to claim 12, wherein the operations further comprise:
- sending, by the second access server, the user identity signature, the stream identifier, and the authentication success information to an authentication server, wherein the authentication server separately verifies the user identity signature and the stream identifier according to the authentication success information, and neglects the duration of validity of the user identity signature;
- receiving a verification result returned by the authentication server; and
- determining, according to the verification result, whether the verification succeeds.

* * * * *